Nov. 27, 1934.　　　R. D. FAGEOL　　　1,982,049
FUEL CONTROL APPARATUS
Filed March 20, 1931　　　3 Sheets-Sheet 1
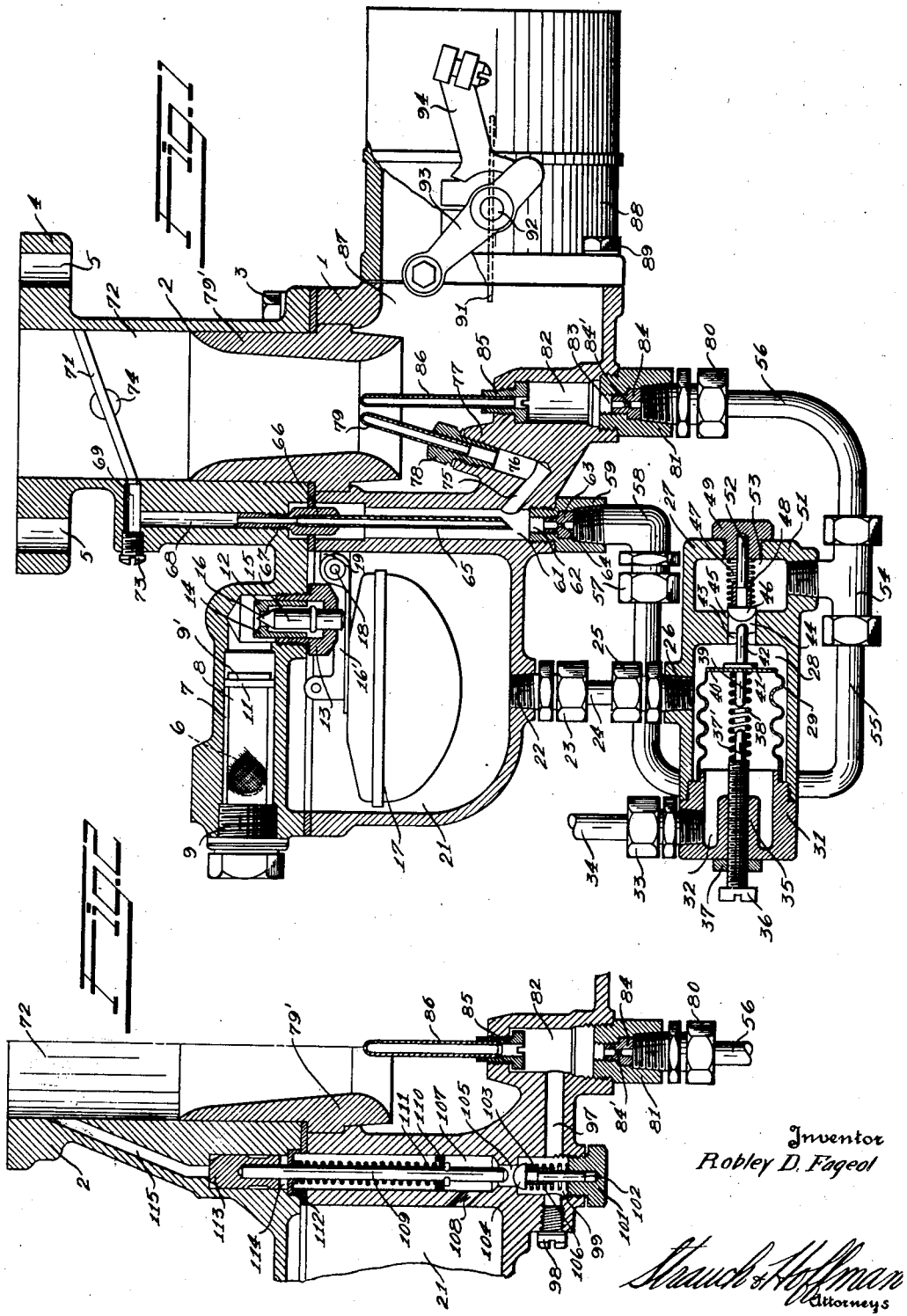
Inventor
Robley D. Fageol Nov. 27, 1934. R. D. FAGEOL 1,982,049
FUEL CONTROL APPARATUS
Filed March 20, 1931 3 Sheets-Sheet 2
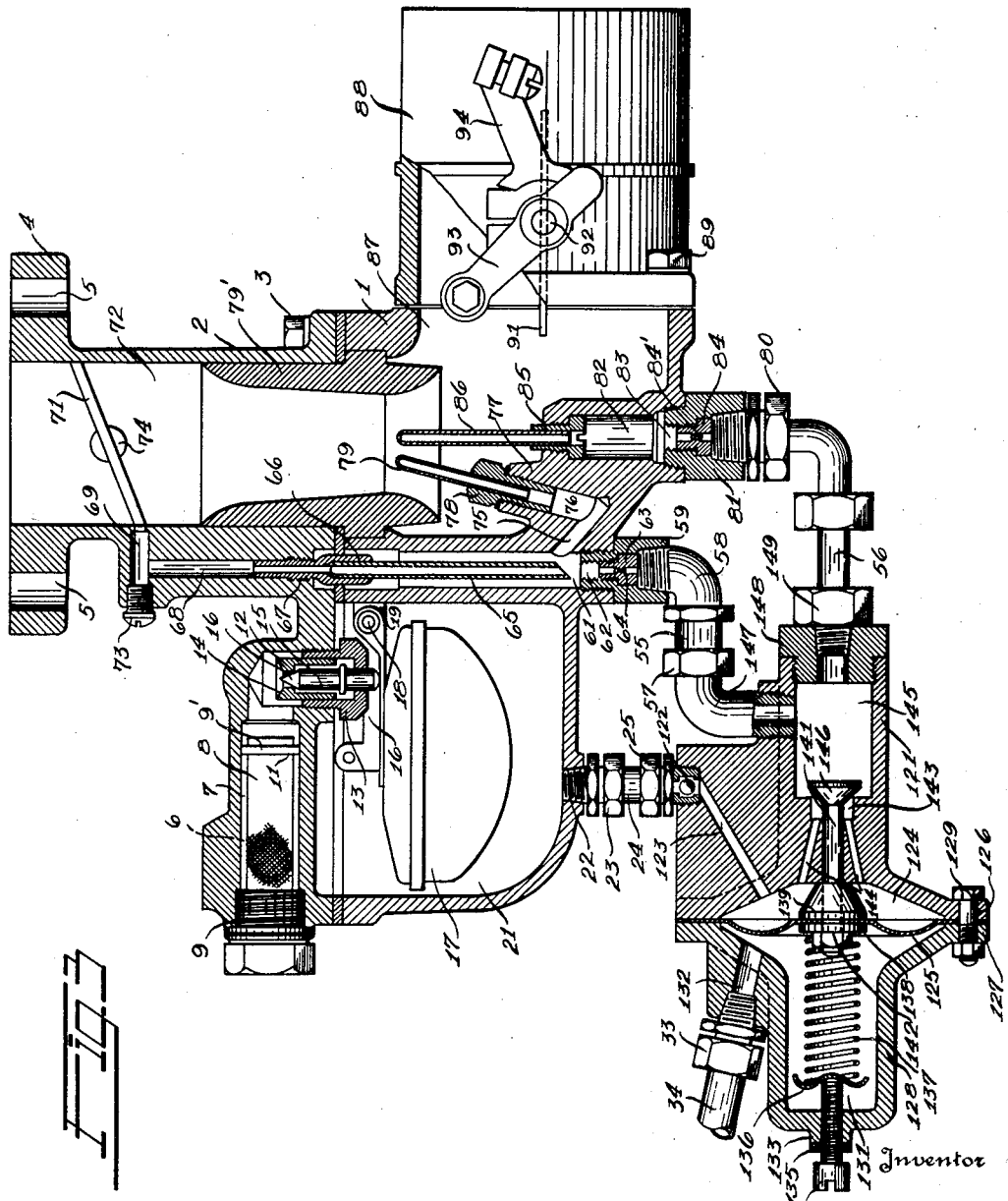
Inventor
Robley D. Fageol
By
Stauch & Hoffman
Attorneys

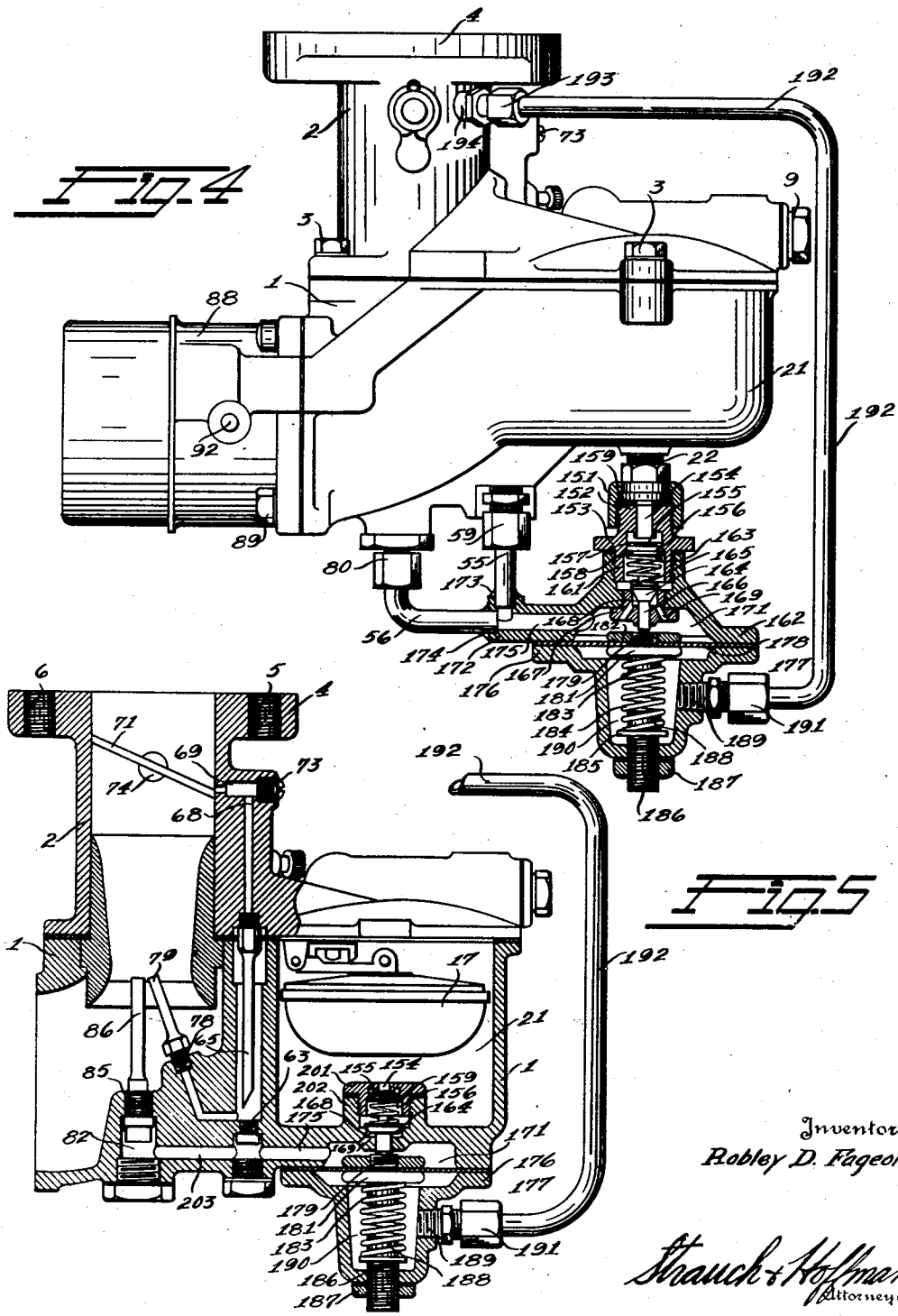

Patented Nov. 27, 1934

1,982,049

UNITED STATES PATENT OFFICE 1,982,049

FUEL CONTROL APPARATUS

Robley D. Fageol, Oakland, Calif., assignor to Leibing Automotive Devices, Inc., Oakland, Calif., a corporation of Nevada Application March 20, 1931, Serial No. 524,148

19 Claims. (Cl. 261—69)

The present invention relates to apparatus controlling the fuel supply for internal combustion engines particularly such as are utilized to propel motor vehicles such as automobiles, buses, rail cars, aeroplanes and the like.

It has been found by extensive experiments that with ordinary operation of motor vehicles that with proper adjustment, during normal idling, acceleration, and periods when the engine is driving the vehicle, effective combustion of fuel is attained and no substantial objectionable discharge of unburned or partly burned fuel occurs. On the other hand, during deceleration periods with the throttle of the engine closed, and the engine turning over at high speed, heavy discharges of unburned and partially burned fuel occur in the form of gases and smoke which are very objectionable and injurious to public health and comfort.

Investigations have shown conclusively that the major portion of gassing and smoking in motor vehicle operation is due to the discharge of unburned and partially burned fuel during deceleration. At the higher motor speeds with the throttle closed, unburned fuel is exhausted, giving off disagreeable odors and fouling the cylinder, exhaust line and muffler. As the motor resumes ignition the hot burned and burning gases mix with the gases in the exhaust line and muffler forming dangerous carbon monoxide gases, and objectionable smoke until the unburned gases are cleared out by efficient combustion of fuel during idling and accelerating operations.

In ordinary operation of automobiles and automotive vehicles during a large percentage of operation the engines are driven with closed throttles by the vehicle momentum at speeds considerably above the speeds at which effective ignition and combustion of fuel fed to the engine can occur. This condition occurs with particular frequency in heavy traffic, and on hills.

With such operation, during a large percentage of time, the engine is decelerating the vehicle, pouring noxious, dangerous gases, smoke, and unburned and partially burned fuel into the atmosphere, creating a general nuisance injurious to public health. In addition the fuel supplied to the engine during decelerating periods performs no useful work and is wholly lost. To reduce this smoke and gas nuisance incident to automotive operation to a point permitting practical operation, high grade volatile fuels must be burned in existing automotive engines, since heavier fuels create so much visible noxious smoke and gas that their use violates public health laws.

It has been found possible to eliminate the evil of gassing and to prevent waste of fuel during deceleration of automotive road vehicles by cutting off the supply of fuel to the engine during deceleration, thereby effecting marked improvements in efficiency and economy of operation of all types of motor vehicles. These highly desirable results are accomplished in simple manner by controlling the fuel supply through utilization of the intake manifold vacuum of internal combustion engines in excess of the normal effective idling intake vacuum. With a mechanism of proper sensitiveness and adapted for ready attachment to existing carburetors, it is possible to control the fuel supply of a properly adjusted internal combustion engine in such manner as to substantially completely eliminate gassing and smoking in operation, and to materially increase the efficiency of the engine, while permitting the effective use of heavier grades of fuel and higher engine compressions, and reducing carbonization and heating of the engines substantially in operation.

Accordingly a primary object of the present invention is to provide novel apparatus for controlling the fuel supply to internal combustion engines in a manner that will substantially eliminate the exhaust of unburned or partially burned noxious gases.

Another object of the invention is to provide improved apparatus for supplying fuel to internal combustion engines only when the fuel will be utilized thereby to do useful work, thereby minimizing fuel consumption and production of noxious harmful gases, and materially increasing the efficiency of operation.

A further object of the invention is to provide improved means for cutting off the fuel supply to an internal combustion engine when the engine ceases to do useful work and to re-establish the fuel supply without appreciable lag when the engine is called upon to do work, and which may be attached to existing carburetors economically and at low cost.

Other objects of the invention are such as will appear from the following detailed description of the preferred embodiment thereof and are defined in the terms of the appended claims.

Referring to the drawings:

Figure 1 is a cross-sectional view showing a preferred embodiment of the present invention.

Figure 2 is a fragmental, cross-sectional view showing an auxiliary control device which may be incorporated in the form of invention shown in Figure 1, if desired.

Figure 3 illustrates a modified form of the invention.

Figure 4 illustrates a further modified form of the invention.

Figure 5 illustrates a form of my invention in which my improved fume eliminator and fuel economizer is built into a carburetor.

In the form of invention shown in Figure 1 a carburetor arrangement comprising a main, supplemental and an idling jet is disclosed, comprising the fuel bowl casting 1 and an upper body casting 2 secured together by cap or machine screws 3 to form a carburetor housing construction. Upper body 2 is provided with a securing flange 4 having holes 5 to receive suitable bolts for securing the carburetor assembly to the intake manifold of an engine in well known manner.

Fuel passes through pipe connection 6 threaded in a suitably tapped boss of upper body 2 into chamber 7 in which filter screen 8 is supported by means of threaded supporting plug 9. The fuel in chamber 7 passes through screen 8 and through opening 9' of end member 11 of the filter screen assembly, to the fuel valve assembly 12. Fuel valve assembly 12 comprises a fuel valve supporting plug 13 threaded into a suitably tapped hole in casting 2. Plug 13 supports valve seat member 14. A float operated valve member 15 provided with the tapered end section 16 is slidably supported for vertical movement in valve member 14, and a central guide opening is formed in plug 13 through which the lower end of valve member 15 projects. The lower end of valve member 15 engages and is actuated by float supporting hinge 16 to which a float 17 is secured. Hinge 16 is pivotally supported by axle 18 from float hinge bracket 19 which in turn is supported from a wall of float chamber 21 in which float 17 is disposed.

As is well understood, float 17, operated by the level of fluid in chamber 21, operates float valve 15 to maintain an approximately constant level of fuel in the float chamber.

Float chamber 21 is formed in bowl casting 1 and a fuel outlet pipe connection 22 is formed in the bottom of the float chamber. Pipe connection 22 is connected by means of union 23 to a fuel supply pipe 24 in turn connected by means of union 25 to pipe connection 26 of my improved gas fume eliminator and economizing device or attachment 27. Fuel from connection 26 passes into supply chamber 28 of attachment 27, and surrounds a bellows or sylphon device 29 preferably, but not necessarily, of resilient metal, which is supported by a threaded end closing plug 31 of chamber 28. It is to be noted that bellows member 29 cooperates with the chamber 28 to form a suction and discharge pump and is elongated so that comparatively slight pressure differences will product substantial elongating and contracting movements for reasons that will more fully hereinafter appear.

Formed in plug 31 is a recess or chamber 32 which communicates with the interior of bellows 29 and which communicates through a pipe connection 33 and the conduit 34 with the intake manifold of the engine on the engine side of the throttle, so that in operation the pressures on the intake side of the throttle are reflected in the interior of bellows 29, causing the bellows to expand and contract in a manner and for a purpose that will more fully hereinafter appear.

Threaded in a suitably tapped hole formed in central boss 35 of end plug 31 is an adjusting screw 36 provided with lock nut 37. Formed on the inner end of screw 36 is a spring centering pin 37' which projects into and positions one end of compression spring 38, the opposite end of which projects over and is located by centering pin 39 secured to the inner surface of end wall 40 of bellows 29.

Secured to the outer surface of end wall 40 is base section 41 of a guide pin 42, which is located by and slides between guide wings 43 formed in central passage 44 of dividing wall 45. Base section 41, it is to be noted, is adapted to engage dividing wall 45 and to form a limiting stop for the extending movement of bellows 29 which prevents over extension of the bellows in operation, and prevents the expansion of the bellows beyond the elastic limit of the metal when a resilient bellows is utilized. The free end of pin 42 is adapted to engage the head of cut-off valve 46 which is normally in sealing engagement with the end of passage 44 by means of a compression spring 47, one end of which surrounds and is located by tubular guiding extension 48 of valve 46, and the other end of which abuts against screw plug 49 threaded into a tapped hole formed in the end wall 51 of attachment 27. Tubular extension 48 of valve member 46 is slidably supported and guided by pin 52 rigidly secured at one end in plug 49.

Valve 46 controls flow of fluid between chamber 28 and chamber 53 of attachment 27. Communicating with the bottom of chamber 53 is a T pipe connection 54 which at one end is connected to the idling and supplemental fuel supply tube 55, and at its other end is connected to the main jet fuel supply tube 56. Tube 55 is looped and connected at its opposite end by means of the union 57 through pipe connection 58 to plug 59 which in turn is threaded into a suitably tapped section of vertical bore 61 formed in bowl 1.

Formed centrally in plug 59 is tapped fuel passage 62 in which the idling and compensating jet regulator 63, provided with the fuel metering orifice 64, is threaded. Disposed centrally in chamber 61 is tubular extension 65 of idling jet 66 the upper end of which is threaded at 67 in the tapped lower end of fuel passage 68 formed in upper body 2, and into which fuel passes from the restricted end of jet 66 for idling purposes. The upper end of passage 68 communicates with cross passage 69 the inner end of which terminates adjacent throttle valve 71 in passage 72 of casting 2, and the outer end of which is closed by a removable threaded priming hole screw 73.

Throttle valve 71 is supported on a throttle valve shaft 74 which is journaled in suitable bearings formed in casting 2, and operated in well known manner by a leverage, not shown, to vary the area of passage 72.

The lower part of chamber 61 is connected by passage 75 to a supplemental jet supply passage 76 which extends upward in boss 77 of casting 2. Threaded into the upper end of passage 76 is a supplemental fuel jet 78 the tip 79 of which terminates in the throat of Venturi member or choke tube 79', which is removably supported in castings 1 and 2.

The upper end of tube 56 is connected by union and pipe connection 80 to plug 81 threaded into the lower end of vertical chamber 82 formed in bowl casting 1. Centrally formed in plug 82 is a tapped fuel inlet passage 83 through which fuel is fed into chamber 82 from tube 56, and in which the main jet regulator 84, provided with the metering orifice 84' is threaded.

Suitably threaded in the upper wall of chamber 82 and projecting therefrom is main fuel jet 85, the tip 86 of which terminates adjacent tip 79 of supplemental jet 78, at the minimum area or throat of Venturi member 79'.

Formed in casting 1 is an air chamber 87 which communicates with an air inlet pipe section 88 secured by means of cap screws 89 to a suitably formed flange on casting 1. Mounted for rotation in air intake 88 is an air shutter 91 supported on the air shutter shaft 92, to a projecting end of which the air shutter lever 93 is rigidly secured. Also secured to shaft 92 is a stop arm 94 adapted to limit the motion of the air shutter 91. Air shutter 91 may be controlled by any suitable choke connection in well known manner.

In order to maintain a balanced pressure between float chamber 21 and fuel jets 66, 78 and 85 an air passage from chamber 87 to float chamber 17 (not shown) is provided in the fuel bowl 1 and in the upper body 2.

Operation

In operation of the invention so far described, the compression of spring 38 is adjusted by means of screw 36 so that when the pressure on the engine side of the throttle and in the intake manifold is equal to or higher than the normal idling intake pressure, bellows 29 will be expanded sufficiently to cause pin 42 to engage and unseat the valve 46 permitting fuel to flow freely from float chamber 21 through chamber 28, passage 44, chamber 53, tubes 55 and 56 to jets 66, 78 and 85; and when the engine intake manifold pressure drops slightly below normal idling pressure bellows 29 contracts sufficiently to permit valve 46 to seat completely cutting off fuel flow through passage 44 until the intake manifold pressures again reach the normal idling pressures. The proportions and balance of parts should be such as to maintain valve 46 open sufficiently to maintain proper idling, and to cause a sufficient contraction of bellows 29 immediately upon a slight drop of intake manifold pressures below normal idling pressures to immediately cause complete closing of valve 46. The use of a sensitive bellows and spring arrangement having a substantial degree of motion for a slight pressure drop below the critical value is desirable as lack of sufficient sensitivity will make the device sluggish and less effective practically.

When the engine is idling in the arrangement shown, substantially all the fuel supply for operation is fed from the idling jet 66 through passages 68 and 69 into the passage 72 to mix with air that passes throttle valve 71. Between idling and full power the fuel is supplied by the main and supplemental jets 85 and 78, the main jet being proportioned to be more effective at the higher and the supplemental jet being proportioned to be more effective at the lower speeds of operation. The air is measured by the venturi and fuel is carried into the air stream slightly above the throat venturi 79 from the main and supplemental jets, and with proper adjustment economical and efficient operation throughout the range of useful driving operation of the engine is secured. While the engine is doing useful work, my improved fume eliminator and economizer attachment has no effect. When, however, the engine ceases to do useful work, and the load drives the engine, as for example when throttle 71 is closed during deceleration, the pressure in the intake manifold drops below the normal idling intake manifold pressure, and the tendency of the bellows to contract will overcome the compression of spring 38 sufficiently to permit sudden retraction of bellows 29. This contracting action of the bellows withdraws pin 42 from valve 46 which will then seat under the action of spring 47, and tightly close passage 44.

As bellows 29 contracts an increased space for fuel is provided in chamber 28, and as valve 46 is seated under the influence of spring 47 the fuel level in jets 66, 78 and 85 will drop under the influence of gravity to replace fuel that flows from chamber 53 through opening 44 into chamber 28 while valve 46 is closing. Accordingly as the bellows contract the jets 66, 78 and 85 will be robbed of fuel and no fuel will pass from the jets while bellows 29 remains contracted and valve 46 remains seated.

When the throttle valve 71 is again opened the pressure in the intake manifold of the engine will rise in well known manner, resulting in an immediate increase of pressure in bellows 29 and in immediate expansion of the bellows so that when the intake manifold pressure reaches normal idling pressure, pin 42 will unseat valve 46 permitting the free flow of fuel from chamber 28 and float chamber 21 into chamber 53. As bellows 29 expands and valve 46 opens, the expanding action of the bellows forces fuel from chamber 28 into chamber 53, through tubes 55 and 56 to jets 66, 78 and 85, so that simultaneously with the restoration of a manifold pressure equal to or higher than the normal idling intake pressure, the fuel supply is restored to the jets. With this arrangement it has been found in practice that no appreciable lag in the supply of fuel to the engine is noticeable upon opening of the throttle suddenly after deceleration and tests in heavy traffic operation of buses equipped with the disclosed device have shown a surprising increase of fifty to sixty percent in gasoline mileage by use of the present invention.

The pumping action of the bellows 29 in withdrawing the fuel supply from the jets upon contraction and replacing the fuel supply in the jets upon expansion and opening of valve 46 is an important function of the present invention, as it increases the sensitiveness of response of the device in operation. It is furthermore to be noted that the use of the comparatively long bellows and spring construction gives a substantial movement of the pin 42 in response to comparatively slight pressure changes which also aids in securing a sensitive action and eliminates the need for multiplication of the bellows motion on the valve to give the desired sensitivity of response of the device in practical operation.

Modified forms of invention

If desired, a fuel economizing and accelerating device may be provided for the main jet 85 of the form of invention so far described. In this form of the invention as shown in Figure 2, a passage 97 is formed in fuel bowl 1 which communicates at one end with fuel supply chamber 82 of main jet 85, the outer end of which is closed by a screw plug 98, and which communicates with a valve chamber 99 closed by the screw plug 101. Secured centrally in screw plug 101 is valve guide pin 102, the upper end of which fits slidably into and guides tubular shank 103 of valve 104. Valve 104 is normally held in engagement with and closes the lower end of fuel passage 105 by action of compression spring 106 interposed between the valve head and plug 101. The upper end of passage 105 communicates with a vertical chamber 107 the lower end of which communicates through a passage 108 with float chamber 21. Positioned centrally in chamber 107 is valve operating pin 109, the lower end of which is adapted to engage and unseat valve 104. Secured on pin 109 is a collar 110 against which the lower end of compression spring 111, surrounding pin 109 abuts. The upper end of spring 111 abuts cupped guide member 112 secured in a suitable recess formed in upper body 2. Pin 109 passes slidably through and is guided in a central opening formed in member 112, and rigidly secured to the upper end of pin 109 is actuating piston 113 which is mounted for reciprocation in cylindrical bore 114 formed in casting 2.

A passage 115 in body 2 establishes communication between the upper end of bore 114 and passage 72 above the throttle 71 so that the engine intake manifold pressures are reflected at all times above piston 113 in bore 114.

In operation of this device the compression of spring 111 is so adjusted that with throttle 71 partly closed, and the engine operating, sufficient suction is created in passage 115 and above piston 113 to hold valve operating stem 109 upward against the pressure of spring 111. Accordingly under partly closed throttle conditions, and with a comparatively slight vacuum in the engine intake manifold, stem 109 is held out of engagement with valve 104, and the valve is held closed cutting chamber 107 off from chambers 99 and 82. Under such conditions the entire fuel supply for jet 85 passes through the main compensating metering orifice 84' from tube 56.

When, however, throttle 71 is opened wide to secure full driving power of the engine, the intake manifold pressure increases and the pressure in passage 115 and bore 114 above piston 113 correspondingly increases with the result that piston 113 is permitted to move downwardly under influence of spring 111 and rod 109 will then engage and unseat valve 104 establishing free communication between float chamber 21 through passage 108, chamber 107, passage 105, chamber 99 and passage 97 to chamber 82. At the same time the downward movement of rod 109 together with the collar 110 will impart an impulse to the fuel and will force added fuel out through jet 85 supplying a richer mixture to the engine. Valve 104 will remain unseated until the throttle 71 is partially closed and a sufficient lowering of pressure occurs above piston 113 to raise the valve operating piston 113 against the compression of spring 111 to permit valve 104 to close, after which the entire supply of fuel for jet 85 will again be delivered from the tube 56.

Accordingly if the pressure drops below the normal intake manifold idling pressure, piston 113 will be held in upper position, valve 104 will remain closed, and valve 46 will close as above set forth in response to contraction of bellows 29, completely cutting off the fuel supply to the main jet 85, as well as to jets 78 and 66.

If under these conditions the throttle is opened suddenly sufficient pressure may build up to cause bellows 29 to open valve 46, and to cause piston 113 to drop so that in addition to the fuel fed to the jets by the expansion of bellows 29, jet 85 will receive a fuel impulse due to the dropping of piston 113 and opening of valve 104 in the manner above described providing an effective arrangement to cause a rapid pick-up of the engine.

In the form of invention shown in Figure 3, the carburetor and jet constructions and vacuum and fuel connections to the fume eliminating and fuel economizing attachment are the same as disclosed in Figures 1 and 2. Like reference characters in this figure are accordingly applied to like parts, and a full understanding of the parts utilized in this form of the invention not hereinafter described in detail may be had by reference to the foregoing description of the similar parts and their functions.

In this form of invention the fume eliminator and fuel economizer 27 disclosed in Figure 1 is replaced by a modified fume eliminator and fuel economizer 121 which is connected to float chamber 21 by means of conduit 24 and the pipe connection 26.

In this form of invention a ball check valve 122 is preferably provided in pipe connection 26 which communicates with passage 123 formed in the body of attachment 121. Check valve 122 when used is constructed so that when the ball is in lower position a free flow of fuel from float chamber 21 to passage 123 may occur while with the ball in upper position communication with float chamber 21 is cut off. Passage 123 communicates with diaphragm chamber space 124 formed in the body of attachment 121, and diaphragm 125 forms a flexible end closure for chamber 124. The outer edge of diaphragm 125 is secured between flange 126 of attachment 121 and the flange 127 of diaphragm head 128 by means of securing screws 129. Diaphragm 125 is formed of any suitable material impervious to liquid fuels used in internal combustion engines, and is preferably of any well known material in common use in diaphragm types of gasoline pumps.

Formed in head 128 is a chamber 131 which communicates through passage 132, pipe connection 33, and tube or conduit 34 with the intake manifold of the engine controlled by the carburetor.

Threaded into a suitably tapped hole formed in boss 133 of head 128 is a spring tension adjusting screw 134 which is locked in adjusted position by a locknut 135. The inner end of screw 134 abuts against a central depression formed in spring abutment member 136 within the outer flanged edge of which one end of compression spring 137 is nested.

The opposite end of spring 137 abuts against washer 138 which serves to clamp diaphragm 125 against diaphragm securing and stop member 139 screwed on the threaded end of valve stem 141. Washer 138 is locked in position against diaphragm 125 by means of a locknut 142 also screwed on the threaded end of stem 141.

Stem 141 is slidably guided in a bore formed in the body of attachment 121 and terminates in a chamber 143 which communicates with chamber 124 through a series of passages 144. Chamber 143 opens into chamber 145 formed in the body of attachment 121, and communication between chambers 143 and 145 is controlled in a manner that will more fully hereinafter appear by the frusto-conical valve head 146 formed integrally with the valve stem 141.

Communication with idling jet 66 and the supplemental jet 78 is established through tube 55 by means of the pipe connection 147. The end of chamber 145 is closed by screw plug 148 and communication between chamber 145 and main fuel jet 85 is established through the conduit 56 by means of pipe connection 149.

In operation of this form of invention, the compression of spring 137 is adjusted by means of screw 134 so that when the pressure on the engine side of the throttle and in the intake manifold is equal to or higher than the normal idling intake pressure, diaphragm 125 together with valve 146 will be forced to the right sufficiently in Figure 3 to unseat valve 146 sufficiently to permit fuel to flow freely from float chamber 21 past check valve 122 through passage 123, chamber 124, passages 144, chambers 143 and 145, tubes 55 and 56 to jets 66, 78 and 85; and when the engine intake manifold pressure drops slightly below normal idling pressure, the resultant lowered pressure in chamber 131 permits the pressure in chamber 124 to force diaphragm 125 to the left seating valve 146 and completely cutting off fuel flow into chamber 145 until the intake manifold pressures again reach the normal idling pressures. The proportions and balance of parts should be such as to maintain valve 146 open sufficiently to maintain proper idling, and to cause a sufficient movement of diaphragm 125 upon a slight drop of intake manifold pressures below normal idling pressures to immediately cause complete closing of valve 146. The use of a sensitive diaphragm and a long sensitive spring permitting a substantial degree of motion for a slight pressure drop below the critical value is desirable in practical operation.

When the engine is idling in the arrangement shown, substantially all the fuel supply for operation is fed from the idling jet 66 through passages 68 and 69 into the passage 72 to mix with air that passes throttle valve 71. Between idling and full power the fuel is supplied by the main and supplemental jets 85 and 78, as set forth in connection with Figure 1. While the engine is doing useful work, my improved fume eliminator and economizer attachment has no effect. When, however, the engine ceases to do useful work, and the load drives the engine, as for example when throttle 71 is closed during deceleration, the pressure in the intake manifold and in chamber 131 drops below the normal idling intake manifold pressure, and the pressure in chamber 124 will overcome the compression of spring 137 sufficiently to cause sudden movement of diaphragm 125 to the left and closing of valve 146.

As diaphragm 125 moves to the left in Figure 3, an increased space for fuel is provided in chamber 124, and as valve 146 closes sufficient fuel flows from chamber 145 through passages 144 under the influence of gravity to cause the fuel level in jets 66, 78 and 85 to drop sufficiently to immediately cut off the fuel flow from the jets. Accordingly as the diaphragm moves to the left the jets 66, 78 and 85 will be robbed of fuel and no fuel will pass from the jets while valve 146 remains seated.

When the throttle valve 71 is again opened the pressure in the intake manifold of the engine will rise in well known manner, resulting in an immediate increase of pressure in the chamber 131 and in immediate movement of diaphragm 125 to the right in Figure 3 intake manifold pressure reaches normal idling pressure, valve 146 will be unseated permitting the free flow of fuel from chamber 124 and float chamber 21 into chamber 145. As diaphragm 125 moves to the right and valve 146 opens, the expanding action of the diaphragm imparts an impulse to the fuel in chamber 124, causing the ball in check valve 122 to move upward momentarily to cut off fuel flow back into chamber 21 due to the impulse, and forcing fuel from chamber 124 into chamber 145, through tubes 55 and 56 to jets 66, 78 and 85, so that substantially simultaneously with the restoration of a manifold pressure equal to or higher than the normal idling intake pressure, the fuel supply is restored to the jets.

In the form of invention shown in Figure 4, pipe connection 22 leading from the float chamber 21 is connected by means of union 151 to threaded projection 152 of check valve body 153. Formed in projection 152 is a central fuel passage 154 against the lower end of which the check valve disk member 155 is adapted to seat in operation as will more fully hereinafter appear. Check valve member 155 is positioned for vertical movement in a chamber 156 communicating with the fuel passage 155, and in its lowermost position radial guide member 157 is adapted to engage and be supported by a washer 158 forced into position against a suitably shouldered section of chamber 156. A packing washer seals the union 151 against fuel leakage.

A tubular extension 161 of member 153 is screwed into a suitably tapped bore formed in attachment casting 162 of my improved fume eliminator and fuel economizer. Disposed in chamber 156 and with its upper end abutting against the lower surface of washer 158 is a valve seating compression spring 163, the lower end of which abuts against the upper surface of valve 164. A spring locating and guiding projection 165 of valve 164 extends into the lower end of spring 163 and locates the spring in operation.

Formed integrally with valve 164 is a guiding and actuating stem 166 slidably guided and supported in a central opening formed in a valve bushing 167 threaded into a suitably tapped hole formed in casting 162. Formed in bushing 167 is a chamber 168, the upper end of which communicates with chamber 166 when valve member 164 is unseated as will more fully hereinafter appear.

Fuel passages 169 formed in valve seat member 167 established communication between chamber 168 and a fuel supply chamber 171, formed in casting 162. Fuel jet supply tubes 55 and 56 are welded into an extension 172 of casting 162 as indicated at 173 and 174. Communication between jet supply tubes 55 and 56, and chamber 171 is established through fuel passage 175 and fuel supply pipes 55 and 56 through the connections 59 and 60, supply fuel to the idling compensating and main jets in a manner that will be clear from the foregoing description in connection with Figures 1 to 3.

Clamped in position between casting 162 and diaphragm head casting 176 by means of securing screws 177 is a flexible diaphragm 178, formed of any suitable material impervious to liquid fuel used in internal combustion engines.

Screwed on the threaded projection 179 of disk 181, which projects through a central opening formed in diaphragm 178, is a disk 182 which locks disk 181 and the projection 179 securely to the central part of diaphragm 178.

In operation spring 163 urges valve 164 toward its seating position shown in Figure 4, and holds the lower end of valve actuating stem 166 in engagement with the upper surface of projection 179.

Disk 181 is provided with a downwardly extending spring centering projection 183 which extends into the upper end of and locates compression spring 184 centrally in chamber 190 formed in casting 176. The upper end of spring 184 abuts against the lower surface of disk 181 and the lower end thereof abuts against compression adjusting collar 185 formed integrally on the threaded adjustment member 186, which in turn is screwed into a suitably tapped hole formed in the lower wall of chamber 190. A locknut 187 adjustably locks member 186 and the compression adjusting collar 185 in the desired position for operation. Spring locating projection 188 formed integrally with collar 185 projects into and locates the lower end of spring 184.

Communication between chamber 190 and the engine side of throttle valve 71 is established through pipe connection 189, union 191, tube 192, union 193, and pipe connection 194.

In operation of this form of the invention compression of spring 184 is adjusted through adjustment of member 186 with the engine operating and throttle closed until the engine idles properly, and so that when the intake manifold pressures drop below normal idling pressures, valve 164 will seat in the manner set forth in connection with the previously described embodiments of this invention. With such adjustment, while the engine is idling the expanding action of spring 184 will overcome the tendency of the diaphragm 178 to move downward due to the subatmospheric pressures created in chamber 190 by the engine suction, and valve 164 will be unseated sufficiently to allow a free flow of fuel from the float chamber, through passage 154 between the radial extensions of the check valve disk 155, through chamber 168, passages 169 into chamber 171, and through passage 175 and tubes 55 and 56 to the fuel jet.

Fuel valve 164 will remain unseated so long as the pressures on the engine side of throttle 71 are equal to or higher than normal idling pressures. When the pressure on the engine side of throttle 71 drops below normal idling pressure, the pressures in chamber 190 will be lowered, and the central portion of the diaphragm together with disks 181 and 182 and projection 179 will move downward permitting valve 164 to seat under the influence of spring 163, thereby shutting off the flow of fuel through chamber 168, passages 169, chamber 171 and the fuel supply passage 175.

As valve 164 seats, continued downward movement of the diaphragm 178 creates more space for fuel in chamber 171 causing a withdrawal of the fuel from the fuel jets, immediately robbing the jets of fuel.

When the pressure on the engine side of throttle 71 rises after closure of valve 164, diaphragm 178 will rise due to the increase of pressure in chamber 190, and will force the fuel upward and into the fuel jets, and when the pressure reaches the normal idling pressure, valve stem 166 will be moved upward, unseating valve 164, and reestablishing the flow of fuel from the float chamber through chamber 168 and passages 169 to chamber 171. If diaphragm 178 rises suddenly, due to a sudden pressure increase in chamber 190, an impulse imparted to the fuel in chamber 171 will be transmitted upward after valve 164 is unseated, causing check valve 155 to seat momentarily against the lower end of passage 154 which will prevent fuel from being forced upward into the float chamber. With check valve 155 momentarily closed, the impulse imparted to the fuel will force the fuel momentarily through passage 175, and the tubes 55 and 56 to the fuel jets, immediately reestablishing the fuel supply so that there will be no perceptible pause in the pickup of the engine when throttle 71 is suddenly opened. As soon as the surge of fuel due to the sudden rise of the diaphragm 178 has stopped, check valve 155 will settle and the flow of fuel will be reestablished from the float chamber to the fuel jet.

In the form of invention shown in Figure 5 an arrangement is disclosed in which my improved fume eliminating and fuel economizing device of the type disclosed in Figure 4 is built directly into a carburetor construction.

In this form of the invention, fuel passage 154 and chamber 156 are formed in a check valve member 201 threaded into a suitably bored and tapped boss 202 formed on the bottom wall of float chamber 21, and chamber 168, passages 169, diaphragm chamber 171 and the connecting passage 175 to the fuel jet are all formed in the carburetor bowl casting 1, rather than in a separate casting 162 as in the form of the invention shown in Figure 4.

Casting 176 is secured by screws 177 and clamps diaphragm 178 directly in position against the lower part of the carburetor bowl 1. Fuel from passage 175 flows to the idling and compensating jets through metering bushing 63 and fuel is supplied to the main jet well 82 from passage 175 through passage 203.

The remaining parts, and the operation of this form of the invention, not specifically described will be readily understood by reference to the foregoing detailed description in which the same reference characters have been applied to similar parts.

While I have described the preferred embodiment of my invention as an attachment for a three jet carburetor, it will be apparent to those skilled in the art that it is equally applicable as an attachment to any well known type of carburetor with one or more jets in a manner that will be obvious to those skilled in the art. Furthermore, it will be apparent to those skilled in the art that various methods of incorporating my invention directly in carburetor constructions may be adopted without departing from the spirit of the present invention as defined in the appended claims.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. A fuel control device comprising means adapted for association with the fuel spraying nozzle and throttle of an internal combustion engine embodying mechanism controlling the fuel supply to the engine; and means responsive only to pressures on the engine side of the throttle lower than normal idling intake manifold pressures of the engine to actuate said mechanism to cut off the fuel supply and to withdraw a portion of the fuel from said spraying nozzle.

2. In combination with the fuel spraying nozzle and throttle of an internal combustion engine, fuel control mechanism; and means operative when the pressures on the engine side of the throttle drop below the pressures normally present when the engine is idling to actuate said mechanism to suddenly withdraw part of the fuel from and to suddenly cut off the fuel supply to said spraying nozzle, and to reestablish the fuel supply and replace the withdrawn fuel when the pressures on the engine side of the throttle rise to normal idling pressures.

3. Fuel control mechanism adapted for association with a fuel ejecting element and the throttle of an internal combustion engine comprising a fuel supply control valve; and expansible and contractible means responsive only to pressures on the engine side of the throttle lower than normal idling intake manifold pressures to withdraw part of the fuel from the fuel injecting element and to actuate said valve to cut off the fuel supply to said element.

4. A fuel economizer and noxious gas eliminator comprising actuating means adapted for connection with the intake manifold of an internal combustion engine and with the engine fuel supply; a fuel control device actuated by said means, and means for adjusting the operation of said actuating means and said device to automatically withdraw fuel from the engine and to cut off the fuel supply to the engine only when the intake manifold pressure drops below normal idling pressures, and to cut on the fuel supply to the engine with a momentary feeding impulse when the intake manifold pressure becomes equal to or higher than the normal idling pressure.

5. The combination as set forth in claim 4 in which said actuating means comprises an expansible and contractible element responsive to the difference in the fuel and manifold pressures.

6. In combination a carburetor assembly comprising a throttle valve, a fuel jet and float chamber; a fuel cut-off valve between said jet and said chamber; and pressure responsive means connected between said chamber and the engine side of said throttle and operative to close said valve only when the pressure on the engine side of said throttle drops below a predetermined value, and to open said valve when the pressure on the engine side of said throttle is equal to or goes above said predetermined value.

7. A carburetor assembly comprising a throttle valve, a fuel jet and float chamber; a plurality of fuel passages between said jet and said chamber; a fuel cut-off valve in each of said passages; and pressure responsive means connected to the engine side of said throttle valve to close said fuel valves when the pressure on the engine side of said throttle valve drops below a predetermined value, and to open said fuel valves when the pressure on the engine side of said throttle valve is equal to or goes above said predetermined value.

8. A carburetor assembly comprising a throttle valve, a fuel jet; float chamber; a plurality of fuel passages between said jet and said chamber; a fuel cut-off valve in each of said passages; and pressure responsive means connected to the engine side of said throttle valve to close said fuel valves in successive order when the pressure on the engine side of said throttle valve drops below separate predetermined values.

9. A carburetor assembly comprising a throttle valve, a plurality of fuel jets; a float chamber; a common fuel passage between said jets and said chamber; an additional fuel passage between one of said jets and said chamber; a fuel cut-off valve in each said passages; and pressure responsive means connected to the engine side of said throttle valve to close said fuel valves when the pressure on the engine side of said throttle valve drops below predetermined values, and to open said fuel valves when the pressure on the engine side of said throttle is equal to or goes above said predetermined value.

10. A carburetor assembly comprising a throttle valve, a fuel jet; a float chamber; a plurality of fuel passages between said jet and said chamber; a fuel cut-off valve in each of said passages; a first pressure responsive means connected to the engine side of said throttle valve to close one of said fuel valves when the pressure on the engine side of said throttle drops below a predetermined value higher than the normal idling intake pressure, and to open said fuel valve when the pressure on the engine side of said throttle valve is equal to or goes above said predetermined value; and a second pressure responsive means connected to the engine side of said throttle to close the other of said fuel valves when the pressure on the engine side of said throttle drops below the normal idling intake pressure on the engine side of said throttle is equal to or goes above the idling intake pressure.

11. The combination as set forth in claim 10 in which both of said pressure responsive means impart a feeding impulse to the fuel as the valves controlled thereby are opened.

12. The combination as set forth in claim 6 together with means interposed between said pressure responsive means and said float chamber for substantially preventing the flow of fuel into said float chamber upon operation of said pressure responsive means.

13. In combination with means for conducting fuel to the intake of an internal combustion engine, a cut off mechanism; and means operative only and immediately when the intake pressures of the engine drop below its normal idling intake pressures to withdraw part of the fuel from said first mentioned means and to substantially simultaneously operate said mechanism to completely cut off the fuel supply to said first mentioned means.

14. In combination with mechanism for conveying fuel to the intake of an internal combustion engine, means operative only and immediately when the engine intake pressures drop below the normal idling pressures to suddenly withdraw part of the fuel from and to cut off the entire fuel supply to said mechanism, and to reestablish the fuel supply and suddenly replace the withdrawn fuel when the pressures on the engine side of the throttle rise to normal idling pressures.

15. In a combustion engine having its intake connected with a carburetor of the type having an idling fuel passage and one or more additional fuel passages; means, actuated in response to intake suction, to completely prevent any fuel from passing into the intake from any of said passages during any time interval between the moment the engine vacuum becomes greater than normal idling vacuum and the moment that the vacuum returns to a value at or less than the normal idling vacuum.

16. In a carbureting mechanism of the type having a jet that always is open and subjected to the suction of the intake of an engine; means for supplying fuel to the jet; and means responsive to a predetermined abnormal suction value, for completely shutting off the fuel supply to the jet and simultaneously retracting at least a large part of the fuel from the jet, said responsive means serving to hold the retracted fuel while the supply is shut off.

17. In the apparatus defined in claim 16, said responsive means embodying means for quickly releasing all of the retracted fuel at the moment the suction returns to normal.

18. In a carbureting mechanism of the type having one or more jets adapted to project into the intake passage of a combustion engine; a fuel supply chamber in communication with said jets; a device responsive to intake pressures and associated with said supply chamber to form therewith a pump; a shut-off valve between the pump and the jets and operable by said pressure-responsive device; said pump having sufficient capacity to retract and hold fuel from the jets when the intake suction becomes abnormal; and said valve being designed to prevent the intake suction from withdrawing the retracted fuel until said suction returns to normal.

19. In the apparatus defined in claim 18, said pump having a discharge action whereby it will suddenly force the retracted fuel to the jets with an impulse when the suction becomes normal.

ROBLEY D. FAGEOL.